United States Patent [19]
Chambers et al.

[11] 4,030,024
[45] June 14, 1977

[54] SWITCHING POWER SUPPLY WITH FLOATING INTERNAL SUPPLY CIRCUIT

[75] Inventors: Derek Chambers, Bedford; Dee Wang, Londonderry, both of N.H.

[73] Assignee: Raytheon Company, Lexington, Mass.

[22] Filed: July 2, 1976

[21] Appl. No.: 702,177

[52] U.S. Cl. .................................. 323/17; 321/2; 323/DIG. 1

[51] Int. Cl.² ................. H02M 7/217; H02M 7/515

[58] Field of Search ............. 323/17, 22 T, DIG. 1; 321/2, 18; 307/297

[56] References Cited

UNITED STATES PATENTS

| | | | |
|---|---|---|---|
| 3,806,791 | 4/1974 | Johnson | 323/DIG. 1 |
| 3,889,177 | 6/1975 | Fendrich, Jr. | 321/2 |

OTHER PUBLICATIONS

"Power Supply Uses Switching Preregulation" by J. S. Riordon Electronics Mar. 9, 1962; pp. 62–64.
"An Inexpensive Switch Mode Power Supply" by R. Curtis Motorola, Inc.; CER 108 1973.
IBM Tech. Disc. Bull. vol. 17, No. 9 Feb. 1975 pp. 2666–2667, "A-D Transistor Switching Reg. Controller" by Calvo et al.

*Primary Examiner*—Gerald Goldberg
*Attorney, Agent, or Firm*—Herbert W. Arnold; Joseph D. Pannone; Milton D. Bartlett

[57] ABSTRACT

A preregulator power supply having drive and control circuits which are isolated or floating alternately from the input and output leads to permit direct coupling to the power switching regulator device without requiring isolation devices such as transformers or optical isolators. This is achieved by an added series winding on the output choke, the common junction of which is connected to the output of the switching regulator and also forms the return lead for the floating drive and control circuits, while the added winding provides a sample output voltage for comparison by the floating drive and control circuits to control the width of pulses fed to the switching regulator device. A free-wheeling diode is also connected from the output of the switching regulator to an output terminal to maintain current in the choke during the OFF cycle of the switching regulator and provide several isolated regulated voltages in windings magnetically coupled to the choke.

14 Claims, 3 Drawing Figures

SWITCHING POWER SUPPLY WITH FLOATING INTERNAL SUPPLY CIRCUIT

BACKGROUND OF THE INVENTION

This invention relates to switching power supplies utilizing an inverter and, more particularly, to a switching power supply of the type which requires an accurately regulated low power source for the control and drive circuits of the power supply itself.

In switching power supplies, attention is usually directed toward improving the power stages such as the inverter and the input and output filter circuits to achieve improved performance and reliability. However, in order to control and drive the aforementioned components, low voltage regulated power at a plurality of levels must be generated. A common method of generating an internal power source utilizes a 60 Hz or line frequency power transforemer followed by well-known rectifiers and series pass regulators which make up the usual internal bias supply. Generally, when a lightweight power supply is required, the 60 Hz transformer contributes a relatively large proportion of the power supply weight. Also, as is obvious, this transformer cannot be operated from a direct current supply voltage source which is often used in uninterrupted power systems backed up by a battery source. In addition, the transformer input taps must be changed with any change in AC line voltage, say from 115 to 230 volts AC line voltage. When it is desirable to use alternating or direct current as the original source, it becomes necessary to provide DC regulated low voltages obtained from the unregulated DC or rectified AC input power source. This low voltage source can be provided from a voltage divider or emitter follower circuit. However, these methods are extremely inefficient. The voltage divider produces a continuous current drain, and similar dissipation occurs in the emitter follower unless complex feedback and regulation from the main inverter is used.

It is, therefore, an object of the invention to provide an improved switching power supply which contains an efficient, lightweight and low cost regulated internal power supply system for the control and drive circuits of said power supply.

Another object of the invention is to provide a preregulated power supply having a drive and control circuit which is floating or isolated in a manner which permits direct coupling to the power switching regulator device without requiring isolating devices such as transformers or optical isolators.

Another object of the invention is to provide a plurality of regulated voltage levels which are competely isolated from either the power supply common input line or output line an which can be used to provide power to the reference control and inverter drive circuits within the supply.

A further object of the present invention is to provide an improved switching power supply having an internal power source or preregulator that is relatively compact, lightweight and highly efficient in use.

SUMMARY OF THE INVENTION

In accordance with the switching power supply of the invention, the foregoing objects and related advantages include an internal low voltage level switching power supply which utilizes either a DC or rectified AC input and provides a regulated DC output and a plurality of auxiliary regulated DC outputs for other stages of the power supply. The floating internal supply circuit is achieved by adding a well-known switching transistor down chopper having an output voltage which is determined by the width of the pulses fed to the switching transistor connected in series with the input of the supply and a free wheeling diode connected across the power supply at the input side of an output choke, and poled in a manner which maintains current in the choke during the off cycle of the switching transistor.

To achieve a plurality of different regulated outputs from the variable input source, novel voltage drive and comparison feedback circuits are used to control the pulse width of the drive pulses fed to the switching transistor of the internal power supply. The output of the switching transistor is used as a floating voltage level which operates as a return path for the regulating and drive components. A sample output pulse voltage is developed across an added series winding on the output choke, the tap of which is fed from the switching transistor to the return lead in the drive and feedback circuits. This sample output is rectified and compared with an internal reference voltage provided by a zener source to produce an error signal. The error signal varies the pulse width fed to the switching transistor while permitting the voltage level of the internal or preregulated supply to float, and maintains the rectified sample voltage from the extra winding on the choke, and hence the DC output voltage, constant during changes in input voltage. Thus, the negative portion of the output voltage between the output at one side of the choke and the output lead is regulated while the amplitude of the positive portion changes as the input voltage changes. Also, additional windings magnetically coupled to the choke are each of a polarity with respect to a serially connected diode to provide a plurality of isolated regulated half wave voltages. It should be noted that this novel feedback control and drive circuit is connected to the emitter output of the switching transistor without the use of transformer or optical isolating components.

More particularly, the floating portion of the preregulator circuit, in a preferred embodiment of the invention, comprises a free running oscillator. The oscillator triggers a pulse width modulator, the pulse width of which is controlled by the DC level at the output of a well-known operational amplifier which in turn is used in conjunction with the added winding on the choke to sense the main DC output of the preregulator or internal power supply. The reference voltage as supplied by a zener diode to the operational amplifier is also the direct current input for the oscillator. The reference supply voltage during the turn-on time preferably is connected to a well-known start-up circuit comprising an emitter follower. When the oscillator voltage, which also floats up and down with respect to the common power supply input-output lead, has an output sufficient to drive the switching transistor, the emitter follower in the start-up circuit is then cut off by rectified voltage from the winding on the output choke which raises the emitter voltage to that of its base.

In the above manner, the novel control circuit for the switching transistor, which adjusts the internal source of power, is directly tied to the pulse voltage output of the switching transistor itself and the added winding of the choke, to achieve direct control of the internal preregulator source. By additional pairs of leads magnetically coupled to the output choke, a plurality of regulated rectified DC output voltages isolated with respect to each other are also provided. As will be described, the regulation of the voltage on each winding occurs only during the regulated portion of the switching power supply cycle, which is when the switching transistor is nonconducting.

With respect to the timing of the novel circuit, when the switching transistor is turned on, the choke by its input tap is connected to the input line voltage, and current increases in the choke. When the switching transistor is turned off, the voltage at the input tap of the choke swings lower until the free-wheeling diode conducts and clamps the voltage at the input tap of the choke to the common input-output lead. At the same time, voltage developed by the sample winding on the choke is rectified to provide power for the internal drive circuits including the zener reference. The rectified sample voltage is compared with the zener reference voltage to control the pulse width of the switching transistor by providing a feedback loop including the input to the switching transistor. This feedback loop compensates for any change of the input voltage to the switching transistor. This novel operation permits the entire internal power supply elements to drive the base emitter of the switching transistor directly without isolation transformers or optical couplers common to other power supplies. At the same time, the DC output of the power supply represents the average level of the emitter of the switching transistor over a series of pulses which is regulated against input voltage changes by the pulse width modulator, as will be further described. In effect, the output voltage of the power supply is provided as the average of the on-time versus off-time of the switching transistor.

Thus, instead of comparing the average DC output voltage against a reference voltage to derive the voltage for controlling the pulse width modulator in the usual manner, the sample or added winding on the choke, which is tied to the emitter of the switching transistor, is connected in such a polarity that the half wave rectified output represents the average DC output voltage. This floating rectified voltage is then compared against a reference voltage which is also tied to the switching transistor emitter, and the error signal at the output of the comparison amplifier controls the width of the pulses fed to the switching transistor connected in series with the input of the supply to regulate the average DC level at the output against changes in input voltage. The free-wheeling diode is also connected to the emitter of the switching transistor at the input side of the output smoothing section of the choke and poled in a manner which maintains current in the choke during the off cycle of the switching transistor.

In particular, the invention contemplates a regulated power supply which utilizes the output of a switching transistor in series with a two-section choke, one section or winding of which is connected to the output circuit. The output of the switching transistor also is used as the return circuit for internal drive and comparator elements which during the start-up period are temporarily provided with DC voltage from the input power line and after start-up receive power from the switching transistor. When the input drive to the switching transistor is removed, its output voltage falls until it becomes clamped to the other side of the input-output circuit by conduction of the free-wheeling diode coupled from the input of the two-section choke to the other side of the output, which is common with the input terminal. At the time the free-wheeling diode conducts, additional windings magnetically coupled to the choke provide, by way of series connected diodes, half wave isolated outputs which are also regulated.

It should be noted that by controlling the duty cycle of the switching transistor to regulate the magnitude of the pulse developed across the choke during the free-wheeling period relative to its average level, the smoothed DC voltage at the output of the choke is also regulated. Since this average level of the choke is also tied to the return circuit for the internal drive and comparator elements, no isolation elements are necessary and, when desired, the drive to the switching transistor can be directly coupled.

BRIEF DESCRIPTION OF THE DRAWINGS

For a better understanding of the invention, together with other and further objects thereof, reference is made to the accompanying drawings in which.

DESCRIPTION OF THE PREFERRED EMBODIMENT

Figures 1, 2:
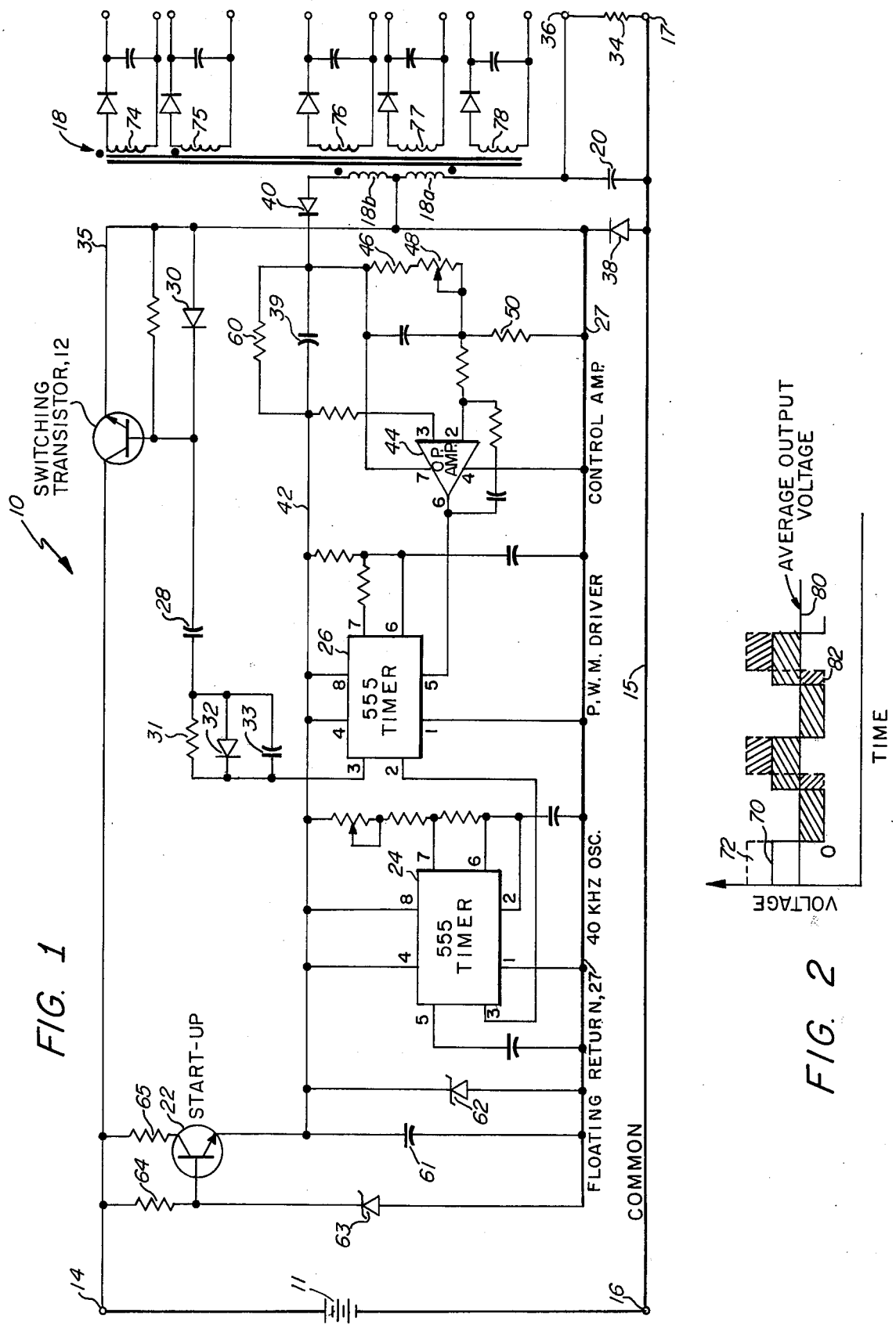
FIG. 1 is a schematic drawing of a semiconductor internal power supply circuit employing the regulating features of the invention.
FIG. 2 shows the waveform at the emitter of the switching transistor used for voltage control of the internal power supply.

Referring now to FIG. 1, there is shown a preregulator circuit 10 which includes a switching transistor 12, connected in series with a DC input circuit at terminals 14 and 16 from a DC source 11 and an output choke 18 having series windings 18a and 18b and an output smoothing capacitor 20. Free-wheeling diode 38 is used to clamp the floating lead 27 to a common lead 15 having terminals 16 and 17. Diode 38 is nonconducting until power is applied. When power is initially applied to input terminals 14 and 16, emitter follower 22 conducts in a known manner to provide a start-up voltage of approximately 5.6 volts which is sufficient to start oscillation in the standard well-known type NE555 timer oscillator circuit 24, such as obtained from Signetics Corporation or equivalent sources, to commence oscillation at, for example, 40 kilohertz. The 5.6 volt source is applied across pins 1 and 8 of timer circuit 24 causing oscillation. The output pulses thus produced on output pin 3 are then used to trigger another identical type timer 26 connected, however, in a well-known manner, as a one-shot multivibrator. Pins 2 and 6 of timer 24 are connected to form a well-known free-running oscillator while pin 2 of timer 26 is not connected to pin 6. Rather, timer 26 is externally triggered by its input pin 2 being connected to the output at pin 3 of oscillator timer 24. Varying the DC level to pin 5 of one-shot multivibrator timer 26 determines the duration or width of the positive output drive pulses at pin 3 of timer 26. These pulses from timer 26 are then applied, in the present embodiment, to the base of the switching transistor 12 by way of coupling capacitor 28 and DC restorer diode 30. The network 31, 32 and 33 sharpens the edges of the pulse applied to the base of switching transistor 12 to speed up the switching times.

It should be understood that pin 3 can be directly coupled to the base of the switching transistor without the aforementioned series components. For example, the capacitor could be shorted out and DC restorer diode 30 removed, if preferred.

When switching transistor 12 starts to switch in response to drive pulses, output pulses appear on the emitter of transistor 12 on line 35 in a periodic manner. These pulses develop a DC average voltage level at the output terminal 36 due to voltage averaging or smoothing action on the periodic pulses through winding 18a and capacitor 20. The main load for the preregulator circuit is connected across terminals 36 and 17. This can be represented by a resistor 34. Also, the emitter lead 35 acts as a common floating return 27 for the complete internal portion of the preregulator 10. The output of second winding 18b, also connected to lead 35, is rectified at half wave by diode 40 to produce on positive lead 42, by way of resistor 60 and smoothing capacitor 39, a common positive voltage for the internal portion of the power supply and at the same time provides a reference voltage for application to a control amplifier 44 which is, for example, a well-known operational amplifier type 741. The sense or sample voltage at the output of diode 40 is compared with the reference voltage across zener diode 62 on lead 42 at the input of the operational amplifier by way of voltage divider network 46, 48 and 50.

Potentiometer 48 is used to adjust the output level at leads 36 and 17 by changing the ratio of voltage across resistors 46 and 48 with respect to voltage across resistor 50. The voltage difference between pins 2 and 3, by well-known circuit action, is made to become substantially equal by the action of the feedback loop. This includes the differential output at pin 6 of amplifier 44, which is connected to pin 5 of pulse width timer 26, which in turn varies the width of the pulses at the base of switching transistor 12. The output pulses at lead 35 are applied across winding 18a of choke 18, and by transformer action samples of these pulses are peak rectified by diode 40 and fed to voltage divider 46, 48 and 50 to pin 2 of amplifier 44. Adjustment of resistor 48 thereby controls the duty cycle, namely, the on-time relative to the off-time of switching transistor 12, and this in turn controls the average level of the output at 36. The aforementioned feedback circuit maintains in this manner the predetermined average output at terminal 36 regardless of voltage variations at input terminals 14 and 16.

The variation in pulse width due to the feedback circuit causes the magnitude of the negative voltage at lead 27 relative to the average voltage at terminal 36 to remain constant and allows the positive excursion to vary in order to maintain the same voltage-time product on each side of the average value.

Thus, connecting the pulse output of the switching transistor directly to the negative floating return 27 of the entire internal power supply including the feedback loop, and using a rectified and smoothed sample of voltage pulses as the control signal, direct control of pulse width modulation of switching transistor 12 is obtained, regardless of the magnitude of the pulse voltage on lead 35, or input voltage at terminals 14 and 16.

The sense voltage is developed in winding 18b which has a polarity such that, as the junction of the windings 18a and 18b at line 35 tends to swing more negative, the output of 18b at diode 40 tends to become more positive, causing the feedback loop to compensate for input voltage changes by maintaining equal voltage-time products above and below the average value at the output.

For example, at the normal operation voltage levels following start-up, lead 42 increases in voltage by means of current through resistor 60 which causes the zener regulator 62 to conduct to regulate the voltage on line 42 and provides the 6.2 volts reference voltage across capacitor 61 to cut off starter transistor 22 by raising its emitter to the same 6.2 volt level as its base. Zener diode 63 maintains the 6.2 input level to transistor 22 during start-up in connection with resistor 64 and load resistor 65. The circuit thus becomes self-sustaining, being provided with its own power from winding 18b.

In operation, therefore, when switching transistor 12 initially conducts in response to a series of pulses at its base, it alternately connects lead 35 to input lead 14 and input lead 16 through free-wheeling diode 38 to provide an average output voltage at output terminals 36 and 17. Whenever the input voltage across terminals 14 and 16 rises, the rectangular pulse voltage on lead 35 also tends to rise, which in turn is sensed by pin 2 relative to the regulated reference voltage at pin 3 of operational amplifier 44. The amplified difference between pins 2 and 3 is applied to pin 5 of the timer 26. The resulting negative change applied to pin 5 of timer 26 causes the pulse width at pin 3 of the timer to be reduced. The switching transistor 12 then conducts for a shorter pulse period to correct for the increase in input voltage on terminals 14 and 16, thus maintaining the output voltage at terminals 17 and 36 substantially constant as shown in the voltage waveforms of the diagram of FIG. 2.

Referring to FIG. 2, waveform 70 represents the initially lower input voltage at terminals 14 and 16, and waveform 72, represented by the dashed line, shows the manner in which the areas of the waveform above and below the average output voltage level of line 80 are equalized by the pulse width control of the conduction time of switching transistor 12. Thus, regardless of the input voltage at terminal 14 and terminal 16, the width of the floating pulse applied to the base of switching transistor 12 is either lengthened or narrowed to maintain the same average value above and below centerline 80, and thus a constant amplitude value from centerline 80 to point 82 in the presence of varying input waveform levels 70 and 72. The voltage level at the centerline 80 is adjusted by potentiometer 48 to the desired output voltage at output terminals 36 and 17 and also at the isolated DC outputs. At the same time, during the period between pulses when switching transistor 12 is cut off, free-wheeling diode 38 conducts and maintains current in winding 18a, and by transformer action, provides a plurality of regulated half wave and separately isolated output voltages in the output windings 74 to 78 due to their corresponding diodes and polarity. The constant voltage portion 80–82 of the waveform which occurs during conduction of free-wheeling diode 38 is thus regulated and used for all the half wave outputs.

Figure 3:
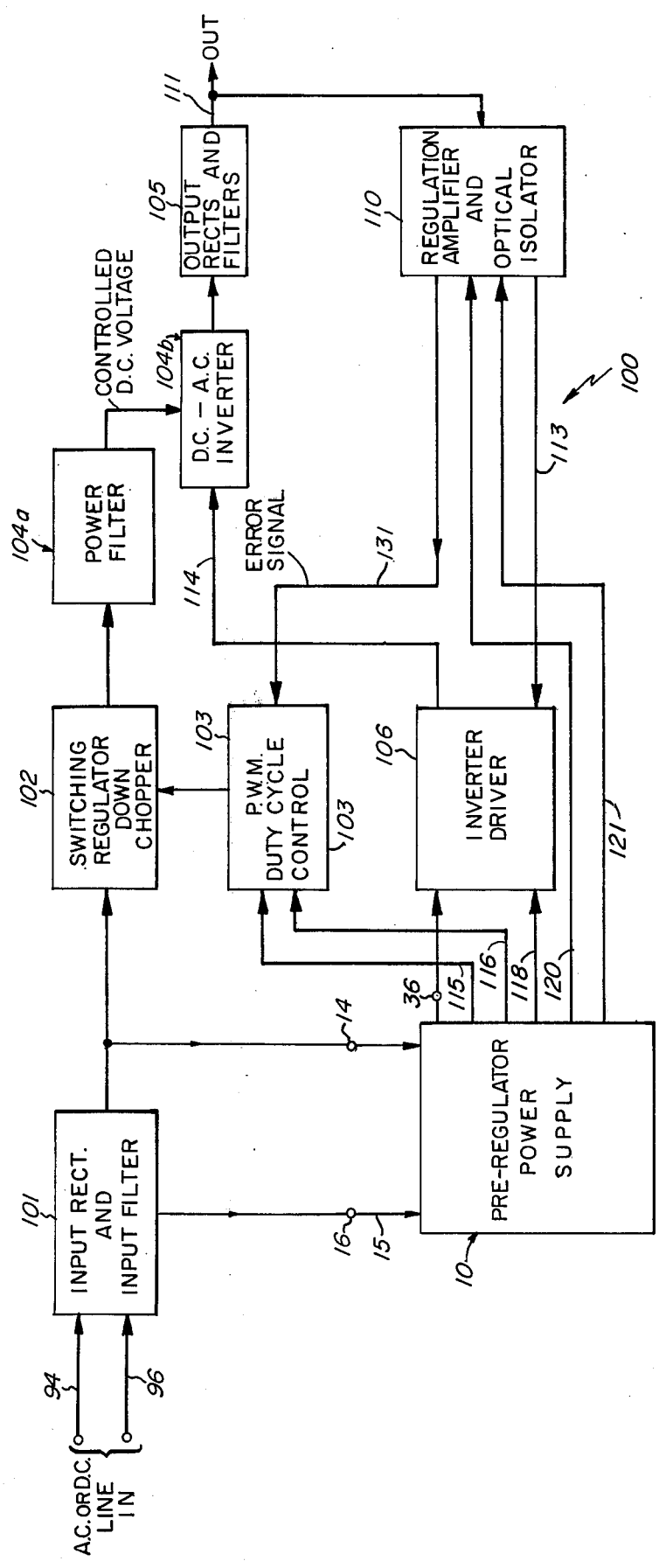
FIG. 3 is a complete block diagram of a main power supply utilizing the preregulator internal power supply circuit of the invention shown in FIG. 1.

Referring now to FIG. 3, there is shown a regulated power supply 100 utilizing the preregulator power supply 10 of the invention. As shown, input lines 94 and 96 can be connected to either an alternating current or direct current source which is fed to a conventional input diode rectifier and filter section 101 for smoothing purposes. The output of filter section 101 is connected to supply a source of direct current to input terminal 14 and to common lead 15 at terminal 16 of preregulator 10. The output of preregulator 10 supplies regulated output voltages for components of main power supply 100. Rectified voltage of approximately 300 volts, for example, is applied from rectifier 101 to well-known smoothing regulator down chopper 102 which provides a regulated DC output fed to power filter 104a. The power filter includes a series choke and free-wheeling diode at its input and filter capacitor at its output. This well-known arrangement, not shown, supplies a regulated controlled DC voltage to a well-known DC–AC inverter 104b. A typical circuit for the above components is shown and described in connection with FIG. 4 of U.S. Pat. No. 3,818,128 of Derek Chambers, entitled "Display Power System", filed May 6, 1970, and assigned to the same assignee as this application and hereby incorporated by reference. The filter and DC–AC inverter can be separate components as shown in FIG. 3, or combined into a single unit.

The DC–AC inverter 104b transforms the controlled DC voltage from power filter 104a into a high frequency square wave which is applied to an output power transformer with secondary windings, not shown, used to provided a regulated DC output from output rectifier and filter unit 105.

To control the chopped output of switching regulator 102, a pulse width modulator 103 controls the duty cycle to obtain a controlled output, as described in the aforementioned patent. An error or sense signal is fed by way of lead 131 from a well-known regulation amplifier and optical isolator 110 which senses the output at line 111 against a conventional internal fixed reference source, not shown, in regulation amplifier 110. The error signal applied by way of the lead 131 varies the width of the drive pulse applied by the pulse width modulator 103 to the switching regulator 102. Also, from a second optical isolator, not shown, an overvoltage protection signal, OVP, is fed by lead 113 to a well-known inverter driver 106, which switches the transistors in the DC to AC inverter ON and OFF by means of a well-known push-pull square wave output on line 114.

It should be noted that during operation switching regulator 102 and its pulse width modulator provide output current to the DC to AC inverter circuit 104b in accordance with sensed variations in the output voltage at lead 111, which sensed variations cause the pulse width of the control pulses, supplied by switching regulator 102 from pulse width modulator 103, to vary directly with respect to the sensed output voltage variations. The pulse width modulator 103 receives the DC error signal on line 131 and varies the width of pulses which control the switching regulator 102. The DC to AC inverter circuit 104 receives the rectified and filtered pulse width modulated power DC output of switching regulator 102, and chops it into a square wave which is applied to the output rectifiers and filters 105. While inverter circuit 104b is a conventional two-transistor push-pull switching circuit, not shown, other inverter circuits of well-known design can be used. The switching frequency of inverter 104b is determined by a control oscillator in inverter driver 106 which includes an astable multivibrator, not shown.

It should be understood that in performing the above-described operation, switching regulator 102 and its pulse width modulator 103 require isolated regulated power which, for example, is conveniently supplied at the pulse width modulator 103 by the rectified half wave voltages on leads 115 and 116, respectively, from, for example, transformer windings 76 and 77 of FIG. 1, each lead for convenience representing a floating pair of leads. In like manner, lead 118 provides regulated DC voltage to the inverter driver 106 from corresponding winding 78 of FIG. 1. Also, the regulation amplifier and optical isolator 110 is supplied an isolated voltage over leads 120 and 121 connected to windings 74 and 75, respectively, of FIG. 1. Thus, separate components 102 and 103, 106 and 110 all require different isolated and regulated outputs. At the same time, the relatively higher power requirements for the power inverter 104b are supplied by way of terminals 36 and 17 of FIG. 1 and by way of driver 106 and lead 114. The preregulator power supply of the invention thus provides these isolated voltages in an efficient, lightweight and compact manner, and since it provides accurate voltage regulation, it also improves the accuracy of regulation of the main power supply.

While a particular embodiment of the invention has been shown and described, various modifications thereof will become apparent to those skilled in the art and, therefore, it is not intended that the invention be limited to the disclosed embodiment or to details thereof, and departures may be made therefrom within the spirit and scope of the invention, as defined in the appended claims.

What is claimed is:

1. A power supply, a pair of input terminals for connection to a source of direct current, a pair of output terminals for connection to a load, a choke coil comprising first and second windings, one end of which is connected to one of said output terminals, the other of said output terminals forming a common lead to one of said input terminals, a switching transistor coupled from a common point of said first and second windings to the other of said input terminals, a free-wheeling diode connected from said common point to said common lead and adapted to conduct during OFF periods of said switching transistor and poled in a direction to provide a current path for said first winding, a first lead forming a common terminal for a plurality of floating power supply elements also connected to said common point, said floating power supply elements connected between said first lead and a second lead and connected by way of a rectifier diode to the other end of said first and second windings, said floating power supply elements including a voltage reference source, and means for comparing the voltage from said voltage reference source with the voltage from said rectifier diode as provided by said second lead, thereby to produce a differential voltage, and means for translating said differential voltage into pulses of varying widths for application to the floating control electrode of said switching transistor.

2. A power supply as set forth in claim 1 which includes a plurality of isolated output windings magnetically coupled to said first and second windings adapted to produce regulated independent half wave output voltages during conduction times of said free-wheeling diode.

3. A power supply as set forth in claim 2 in which each half wave output voltage is fed to a smoothing capacitor to provide a regulated direct current output.

4. A preregulator power supply comprising a switching transistor connected in series with the input circuits of the power supply, a pair of output terminals, said switching transistor connected in series with one terminal of said input circuits of the power supply and a free-wheeling diode, the other side of said free-wheeling diode being connected to one of said output terminals, said latter output terminal connected in common with the other terminal of said input circuits, a tapped choke having a tap connected to the common junction at the output of said switching transistor and said free-wheeling diode and forming a floating return lead for a reference source, drive and comparator elements alternately isolated at predetermined times from said common input-output lead, one end of a winding of said tapped choke connected to an output terminal, the other end of said winding of said tapped choke connected to provide a sample of said output voltage for providing a comparison signal for said reference source, drive and comparator elements, said latter elements including means during conduction of said free-wheeling diode and said switching transistor for comparing the output of said reference source with the sample of said output voltage to provide a comparison voltage, and means in response to said comparison voltage to provide a variable width pulse for application to said input electrode of said switching transistor.

5. In combination:
a pair of input terminals for connection to said source of direct current, a switching transistor and a pair of output terminals, a choke comprising at least first and second windings magnetically coupled to each other, the common junction of said first and second of said windings connected to the output of said switching transistor, the first of said windings connected in series with one of the output terminals, the input of said switching transistor connected to an input terminal, the other of said output terminals connected to the other input terminal, a voltage comparator circuit and a reference source, a free-wheeling diode connected from the common junction of said series connected windings of said choke and the other of said output terminals, said free-wheeling diode poled to maintain current in said first winding of said choke during the OFF cycle of said switching transistor, said common junction also connected as a return lead for said voltage comparator circuit, said latter circuit adapted to compare the voltage sensed across said second of said windings against said reference source to provide a control voltage adapted to vary the periodic conduction times of said switching transistor to regulate the voltage at said output terminals.

6. In combination:
a pair of input terminals for connection to a source of direct current, a switching transistor connected to one of said input terminals, a pair of output terminals, one of said input terminals connected by a common lead to one of said output terminals, a choke including first and second windings magnetically coupled to each other, the common junction of said first and second windings connected to the output of said switching transistor, the first of said windings connected in series with the other of said output terminals, the second of said windings developing a sense voltage output representative of voltage in said first winding and having a polarity such that as the common junction of the pair of windings tends to swing more negative, the output across the second of said windings tends to become more positive, a reference source, a feedback loop including a comparator circuit isolated from said pair of input terminals and coupled to the output of the second of said windings to compare said sense voltage output with said reference source to provide a variable width control signal to regulate the output of said switching transistor, the output of said switching transistor connected as a common return lead for said comparator circuit so that the comparison is made at a plurality of voltage levels with respect to the level of said input terminals, and a free-wheeling diode connected from the output of said switching transistor to said common lead and poled in a direction to maintain current in said first winding during each OFF period of said switching transistor.

7. A preregulator power supply comprising a pair of input terminals for connection to a source of unregulated direct current, a pair of output terminals for connection to a load to be supplied with regulated current, a choke including at least a pair of windings coupled in series with each other, a switching transistor connected in series with one terminal of said pair of input terminals and the common junction of said windings, the opposite end of one of said windings connected to an output terminal, a free-wheeling diode connected from the output of said switching transistor to the other of said output terminals and adapted to maintain current in said one of said windings when said switching transistor is nonconducting, the common connection between the output of said switching transistor, the common junction of said windings of said choke and one side of said free-wheeling diode forming a common internal power supply lead for elements supplying a variable width switching pulse to control said switching transistor and during nonconductive periods of said free-wheeling diode connected to the one of said input leads which is in connection with said one of said pair of input terminals, said elements for supplying said variable width switching pulse including means for comparing the output of the other of said windings on said choke with a direct current reference source to obtain a comparison voltage, and means including one of said elements for traslating said comparison voltage to a variable width pulse for application to said input electrode of said switching transistor.

8. A power supply comprising a pair of input terminals for connection to a source of direct current and a pair of output terminals, a choke comprising at least a pair of separate windings magnetically coupled to each other, a switching transistor, the common junction of said first and second windings connected in series with one of said input terminals by way of said switching transistor, the first of said windings connected in series with the output of said switching transistor and one of said output terminals, the other of said output terminals connected to the other of said input terminals, a voltage comparator circuit and a reference source, a start-up circuit including a series pass transistor coupled to an input terminal for providing a reference voltage in the absence of said reference source prior to conduction of said switching transistor, a free-wheeling diode connected from the common junction of said choke to the other of said output terminals, the output of said switching transistor forming a floating return lead for said voltage comparator circuit and said reference source, the second of said windings poled to provide a sense voltage representative of the voltage in the first of said windings and coupled to provide an operating voltage for said voltage comparator circuit and said reference source during conduction of said switching transistor, said start-up circuit rendered inoperative following conduction of said switching transistor, and means to compare said operating voltage from the second of said windings with said reference source to provide a variable width control signal to regulate the output of said switching transistor, said free-wheeling diode poled in a direction to maintain current in the first winding of said choke during each OFF period of said switching transistor.

9. A power supply as set forth in claim 8 which includes a plurality of isolated output windings magnetically coupled to said first and second windings to produce independent regulated output voltages during conduction times of said free-wheeling diode.

10. A power supply comprising first and second input terminals for connection to a source of direct current, first and second output terminals, a switching transistor connected in series with a first input terminal and one connection of a free-wheeling diode, the other connection of the free-wheeling diode connected to a second output terminal and the second input terminal, a choke comprising first and second series connected windings, the junction of said first and second windings connected to the output of said switching transistor, a reference source and a comparator circuit connected to a return lead coupled to the output of said switching transistor, said first winding connected to the first of said output terminals, means for rectifying the output of said second winding which has a polarity adapted to provide a sense voltage for application to said comparator circuit and said reference source, means for comparing said reference source with said sense voltage to provide an error voltage for varying the width of a control voltage to regulate the output of said switching transistor, said reference source and comparator circuit floating alternately with respect to said switching transistor input and the second output lead in response to alternate conduction of said switching transistor and said free-wheeling diode, said latter diode poled in a direction to maintain current in said first series connected windings during the OFF cycle of said switching transistor.

11. A power supply as set forth in claim 10 which includes a plurality of isolated windings magnetically coupled to said first and second windings adapted to produce regulated and isolated half wave output voltages during conduction times of said free-wheeling diode.

12. A power supply as set forth in claim 11 in which each half wave output voltage is fed to a capacitor to provide a regulated direct current output.

13. In combination:
a power switching regulator, first and second input leads, first and second output terminals, a choke having first and second series connected windings, a reference source, comparison and drive circuits adapted to control the width of pulses fed to said switching regulator device, a free-wheeling diode, said second output terminal connected to said second input lead, said power switching regulator connected in series with said first input lead, the common junction of said first and second series connected windings and said second output terminal and said free-wheeling diode, said free-wheeling diode being poled to conduct on the OFF cycle of said power switching regulator, the output of said first series connected winding coupled to said first output terminal, said second series connected winding poled to provide an output voltage representative of voltage developed across said first series connected winding, means to rectify said output voltage developed across said second series connected winding to provide a direct current comparison voltage, said common junction of said first and second series connected windings and the output of said power switching regulator forming a return lead for said reference source and said comparison and drive circuits, and means for comparing said direct current comparison voltage with the voltage from said reference source to vary the width of said pulses fed to said switching regulator device in response to changes in input voltage applied to said first and second input leads, said reference source and said comparison and drive circuits alternately floating from said first input lead and said second output terminal in response to alternate conduction of said power switching regulator and said free-wheeling diode.

14. The combination as set forth in claim 13 which includes a plurality of isolated windings magnetically coupled to said first and second windings of said choke to provide regulated and isolated output voltages.

* * * * *

UNITED STATES PATENT OFFICE
CERTIFICATE OF CORRECTION

Patent No. 4,030,024  Dated June 14, 1977

Inventor(s) Derek Chambers and Dee Wang

It is certified that error appears in the above-identified patent and that said Letters Patent are hereby corrected as shown below:

```
Column 1, line 19:   change "transforemer" to -- transformer --;
         line 53:    change "competely" to -- completely --;
         line 55:    change "an" to -- and --;
Column 4, line 22:   change "features" to -- feature --; and
Column 10 line 41:   change "traslating" to -- translating --.
```

Signed and Sealed this

Twentieth Day of September 1977

[SEAL]

Attest:

RUTH C. MASON
Attesting Officer

LUTRELLE F. PARKER
Acting Commissioner of Patents and Trademarks